Nov. 23, 1926.  
H. YERKEY  
1,608,013  
MACHINE FOR SHARPENING LAWN MOWER BLADES  
Filed Sept. 7, 1922  
5 Sheets-Sheet 1

Henry Yerkey  
INVENTOR

WITNESSES  
BY  
ATTORNEY

Nov. 23, 1926.

H. YERKEY 1,608,013

MACHINE FOR SHARPENING LAWN MOWER BLADES

Filed Sept. 7, 1922     5 Sheets-Sheet 2

WITNESSES
G. F. Baker
Philip E. Siggers

Henry Yerkey
INVENTOR

BY
E. G. Siggers
ATTORNEY

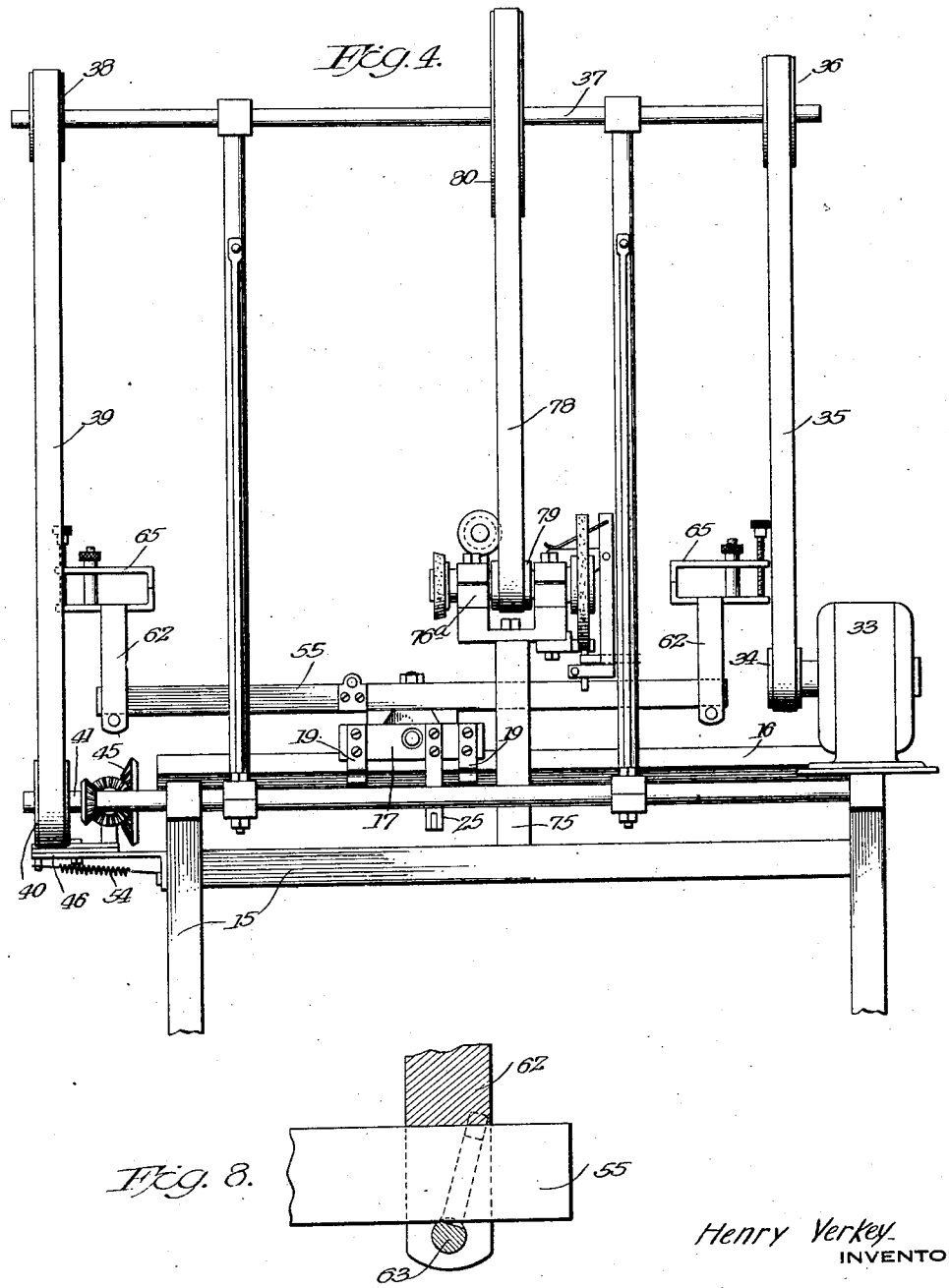

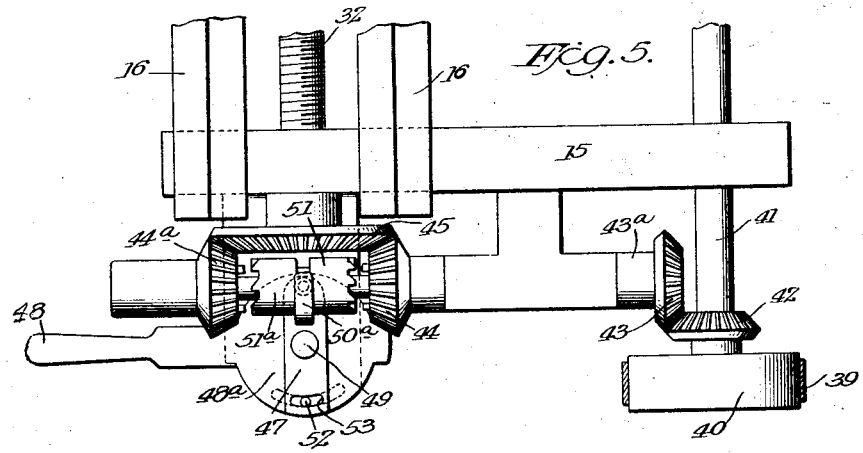
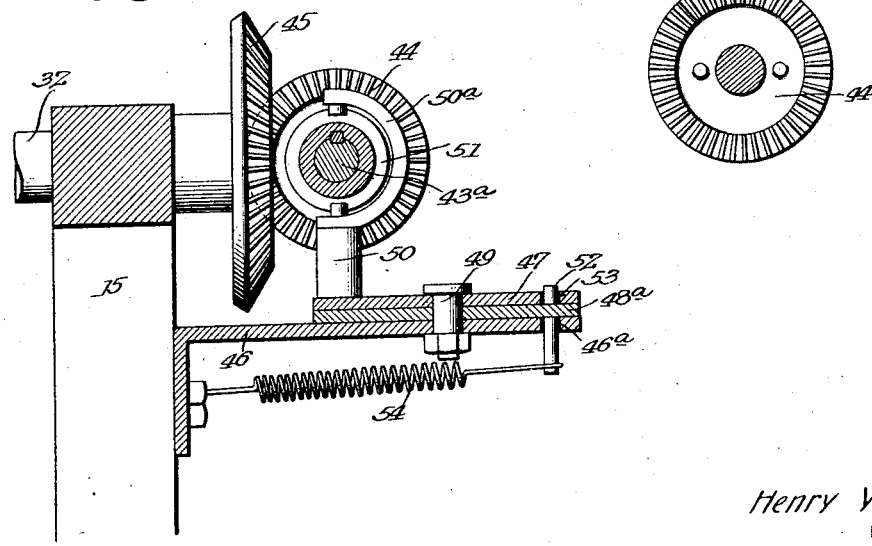

Nov. 23, 1926.  1,608,013
H. YERKEY
MACHINE FOR SHARPENING LAWN MOWER BLADES
Filed Sept. 7, 1922   5 Sheets-Sheet 5

WITNESSES

Henry Yerkey
INVENTOR

BY

ATTORNEY

Patented Nov. 23, 1926.

1,608,013

UNITED STATES PATENT OFFICE.

HENRY YERKEY, OF VIOLA, ILLINOIS.

MACHINE FOR SHARPENING LAWN-MOWER BLADES.

Application filed September 7, 1922. Serial No. 586,687.

This invention relates to improvements in machines for sharpening lawn mower blades and its general objects are to provide a machine which can be accurately adjusted and easily operated and by which the blades of a lawn mower may be quickly sharpened.

Other objects of the invention will appear from the following description.

In the accompanying drawings wherein is shown for illustrative purposes a preferred embodiment of the invention, Figure 1 is a plan view of a machine constructed in accordance with the invention;

Fig. 4 is a rear elevation;

Figs. 5 and 6 are respectively a plan view and sectional elevation of the mechanism for changing the direction of travel of the slide rest;

Fig. 7 is a plan of one of the bevel gears used in the mechanism of Figs. 5 and 6;

Fig. 8 is a detail showing one form of clamp for holding the support for the rotary cutter in adjusted positions;

Figure 1:
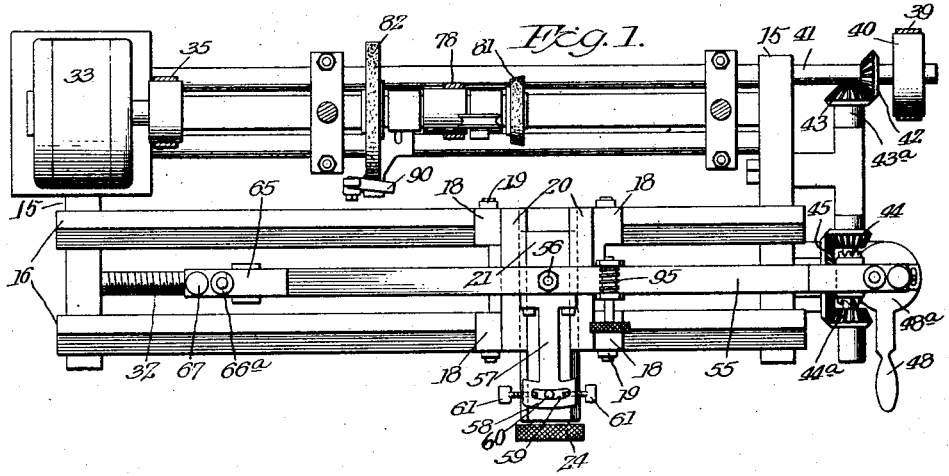
Figure 2:
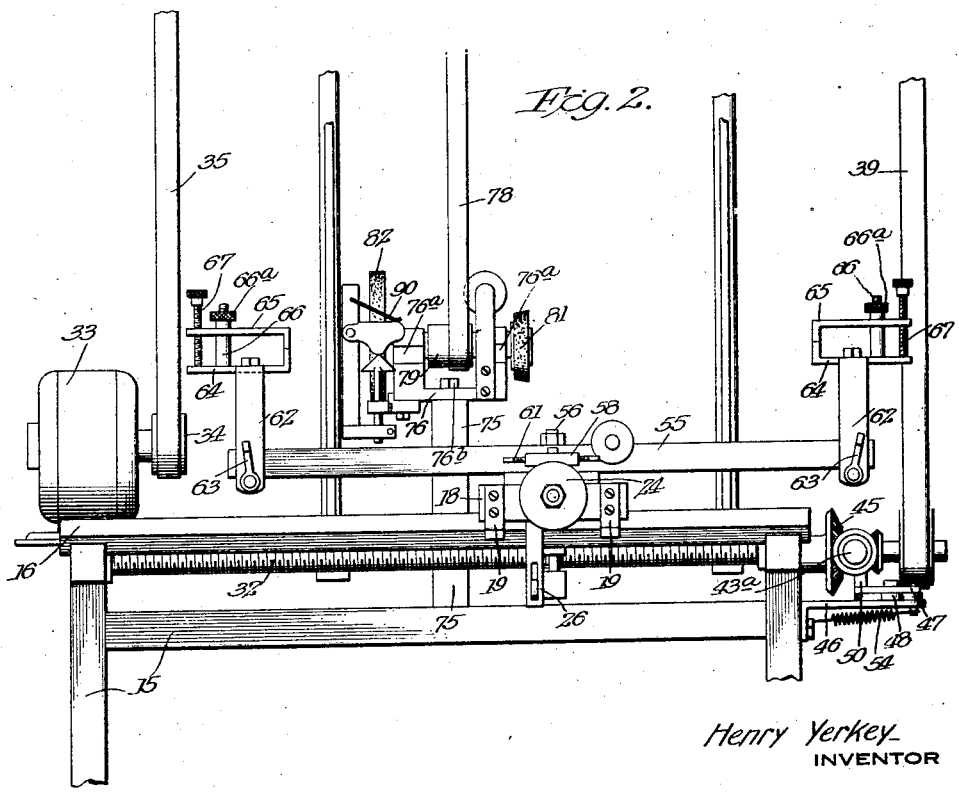
Fig. 2 is a front elevation of the same.

Referring more specifically to the illustrative embodiment of the invention shown in the drawings, and first particularly to Figures 1 and 2, the machine there shown includes a main frame 15 of any convenient construction, but preferably of the knockdown type and supporting a pair of horizontal longitudinally extending and parallel slideways 16. The slideways 16 are preferably made from square steel bars so supported as to present two inverted V-shaped tracks upon which slide rest 17 may travel. The slide rest is shown in vertical section and on a larger scale in Fig. 3. It consists of a main block analogous to a slide rest on a lathe having slides 18 designed to contact with the track surfaces of the ways 16. Guides 19 are attached to the slide rest and extend downwardly to hold the slide rest upon the ways.

The upper side of the slide rest has two parallel plates 20 whose facing edges are beveled as indicated in Figure 1; and a plate 21 having cooperating beveled edges is mounted between the parallel guiding plates 20. Thus, while the slide rest is movable longitudinally of the machine, the plate 21 is movable transversely thereof. The outer end of plate 21 preferably has a depending lug or ear 22 (Fig. 3) secured to a transverse adjustment screw 23 near the knurled head 24 thereof. The adjustment screw 23 passes through a threaded bore provided within the slide rest 17 so that longitudinal movements of the screw 23 will adjust the position of the plate 21.

Figure 3:
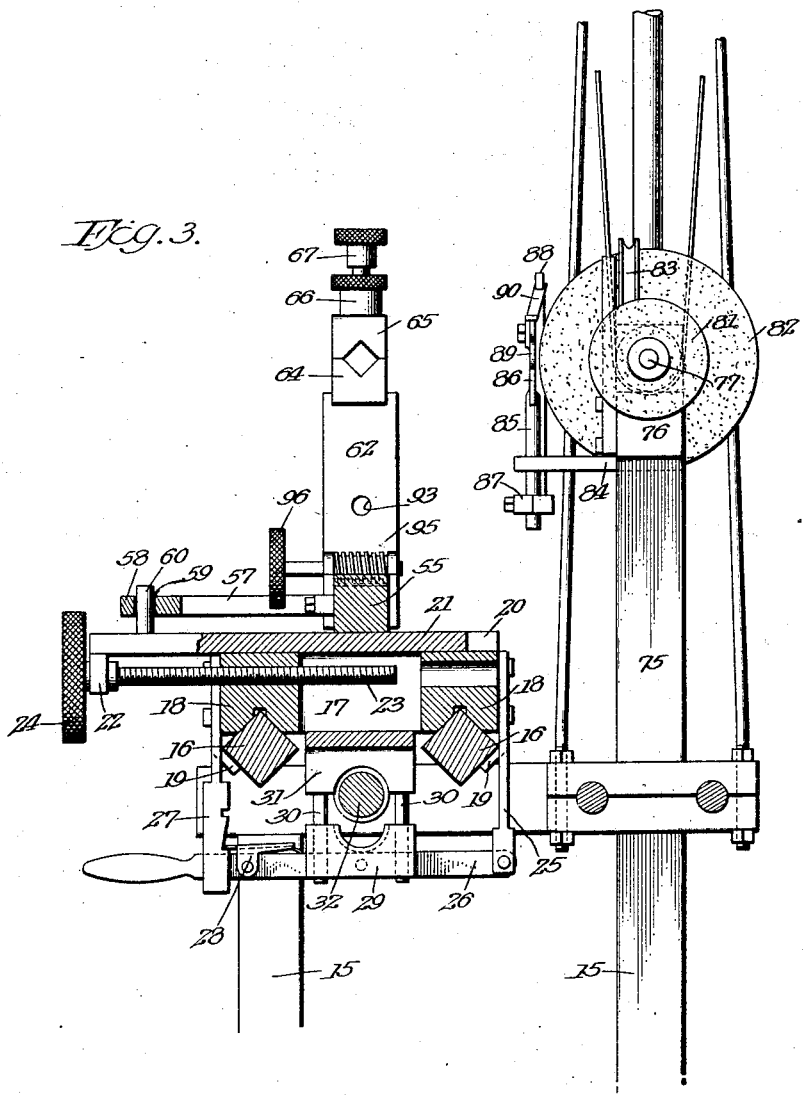
Fig. 3 is a vertical transverse section.

At the rear of the slide rest, as shown in Fig. 3, there is secured a depending bar 25 upon the lower end of which is fulcrumed a lever 26. The front side of the slide rest carries a depending guide 27 for the lever and a dog 28 on the lever is engageable with notches provided in the guide 27 so that the lever 26 may be held in either of two positions. At an intermediate point on the lever, a half nut 29 is pivotally mounted. The half nut 29 has vertical bores adapted to receive a pair of parallel guide pins 30 extending beneath a boxing 31 secured to the under side of slide rest 17. A longitudinally extending feed screw 32 is journaled in the frame 15 midway between the slideways 16 but beneath the same; and the boxing 31 is cut away to permit the slide rest to move along the slideways without interference from the feed screw. When it is desired to drive the slide rest by the rotating screw 32, the lever 26 is moved upwardly until the dog 28 engages with the upper notch of the guide 27, whereupon the half nut 29 is brought into engagement with the feed screw 32; and the slide rest will then move in one direction or the other according to the direction of rotation of the feed screw.

The feed screw 32 is driven preferably by means of an electric motor 33 mounted on the machine frame, which also is utilized to drive the other parts of the machine, as will be described later. The motor pulley 34 drives the pulley 36 which is fast upon shaft 37 by means of a belt 35. See Fig. 4. Shaft 37 also mounts pulley 38 driving pulley 40 on a shaft 41 by means of a belt 39. A bevel gear 42 on shaft 41 meshes with a bevel gear 43 on shaft 43ᵃ at the other end of which another bevel gear 44 is loosely mounted. Referring now particularly to Figs. 5, 6 and 7, it is seen that the bevel gear 44 meshes with gear 45 mounted on one end of the feed screw 32. The shaft 43ª carries a second loose bevel gear 44ª also meshing with gear 45; and the two bevel gears 44, 44ª have pins projecting from the inner faces thereof (Fig. 7) which are adapted to be engaged with a clutch so that one or the other of the bevel gears will drive the feed screw and hence change the direction of rotation of the same. Upon the frame 15 a bracket 46 is secured and supports a lever 48 swingable about a pivot pin 49. The lever 48 is preferably circular at its pivoted end as shown at 48ª. The plate 47 is mounted to swing about the pivot pin 49 above the circular part 48ª and a post 50 is secured at one end of plate 47. Upon the post 50 is a C-shaped arm 50ª having means for engagement with the double clutch member 51ª so as to slide the clutch along shaft 43ª when the plate 47 is swung about its axis. It will be understood that the clutch 51ª rotates with the shaft on which it slides. A pin 52 is secured in the lever end 48ª to extend both above and below the same, the plate 47 having an arcuate slot 53 adapted to pass the pin while the bracket 46 has a similar but longer slot 46ª. To the lower end of pin 52 a spring 54 is attached and at the other end the spring is secured to the machine frame. The function of the spring 54 is to maintain the lever 48 in a neutral position wherein the clutch members 51 and 51ª are out of engagement with the pins and bevel gears 44 and 44ª. Obviously, when the lever 48 is swung in either direction against resistance of spring 54 the slidable rotary clutch will be brought into engagement with a bevel gear causing rotation of the feed screw in the required direction.

While the above described means for changing the direction of rotation of the feed screw 32 is the one I prefer, it will be understood that various other well known mechanisms for effecting the same purpose might be employed.

The parts for supporting the rotary cutter of a lawn mower during the sharpening operation will now be described.

The plate 21 of the slide rest carries a longitudinally extending bar 55 by means of a bolt or the like 56 passing through a central bore in the bar, the arrangement being such that the bar 55 may swing in a horizontal plane about the bolt as an axis. Secured to or integral with the bar 55 at a mid point is an arm 57 extending at right angles to the bar 55 having a head 58 in which slot 59 is provided. A vertical pin 60 extends upwardly from plate 21 through the slot 59 and at each side of the head 58 there is a thumb screw 61 adapted to enter slot 59 and bear against pin 60. As the arm 57 is rigidly connected to bar 55, it will be clear that the latter may be swung about bolt 56 as an axis and be maintained in the desired position by turning the thumb screws 61 into engagement with pin 60.

The bar 55 slidably mounts a pair of upright posts 62 and clamps 63 carried on said posts provide means whereby the posts may be held in the desired positions along the bar 55. The clamps are best shown in Fig. 8. On the upper ends of the posts 62, the clamps for supporting lawn mower reels are mounted. These clamps preferably each include a stationary bar 64 secured to the post 62 and a movable bar 65 adjusted toward or from the stationary bar 64. Upon bar 64 a bolt 66 is mounted and the movable bar 65 is supported by a shoulder provided at the upper end of said bolt. Nut 66ª on the upper end of bolt 66 may be used to force the bar 65 downwardly, while the screw 67 passing through bar 65 and bearing at its lower end against bar 64 is used to force the outer ends of the two bars apart, hence the inner ends together. As seen in Fig. 3, the bars 64 and 65 have meeting notched inner ends adapted to hold the cutter shaft while permitting rotation thereof.

It will be clear that the positions of the posts 62 may be changed to accommodate any length of a rotary cutter while the clamps 64, 65 will hold against rotation any size of cutter shaft. At the same time, the bar 55 may be swung in a horizontal plane causing like movement on the part of the rotary cutter; and as the bar 55 is mounted on the slide rest, it may move transversely of the machine and also travel longitudinally of the machine in either direction.

Figure 9:
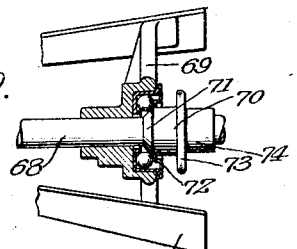
Fig. 9 is a fragmentary view showing a means for supporting the rotary cutter of a ball bearing lawn mower.

Fig. 9 shows my preferred means for supporting a ball bearing lawn mower reel so that the bearings are retained in position. The shaft 68 of the reel 69 is passed through a hollow centering member 70 whose inner end is conical as indicated at 71 so as to permit the centering member to enter the ball race 72. The centering member has an annular flange 73 and a stub shaft or collar 74, the latter being provided so that the clamps 64, 65 may grip the centering member, with flange 73 bearing against the clamp ends. The reel may then be rotated freely.

The blade grinding or sharpening means will now be described, and reference should be had particularly to Figs. 2, 3, 4 and 10. Upon the main frame there is secured a support for a plurality of abrasive wheels, and said support preferably comprises a standard 75 mounting bearings 76ª for a shaft 77. The shaft may be driven by a belt 78 passing around pulley 79 on shaft 77 and over pulley 80 on the main shaft 37. The bearings 76ª are provided on an arm 76 mounted to swing on standard 75 about a bolt 76$^b$ as an axis. This bolt may be used to hold the shaft 77 in various adjusted positions, and hence adjust the positions of the grinding wheels 81, 82 which are fast upon opposite ends of shaft 77. The grinding wheels preferably are both emery wheels, and the periphery of emery wheel 81 is preferably beveled while emery wheel 82 is of the ordinary circular form. I contemplate using emery wheel 82 for grinding the blades of the rotary cutter of lawn mowers, and wheel 81 for grinding the straight cutter bar; and the pivotal mounting of arm 76 permits the wheel 81 to be swung and locked in such position (about one quarter of a turn) that its periphery engages the cutter bar at the proper angle, as shown clearly in Fig. 10. In order to hold belt 78 in driving position when the arm 76 is so turned, a vertical idler pulley 83 is mounted on arm 76.

When arm 76 is turned, the effect will be to twist the belt 78 and thus shorten its effective length. The standard 75 is mounted on the machine frame so that it can be raised slightly to compensate for the tightening of the belt.

Figure 10:
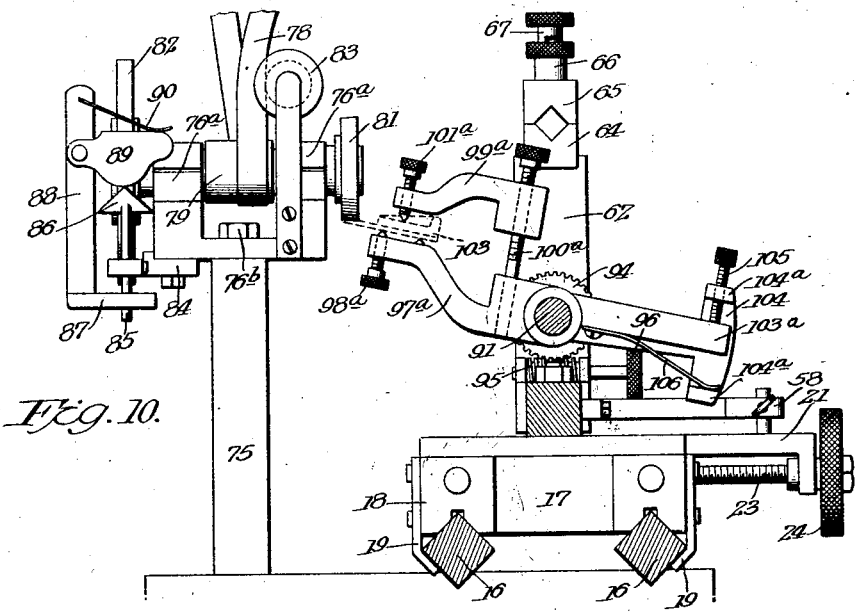
Fig. 10 is a view in vertical section showing the machine used for sharpening a cutter bar.

It will be recalled that the reels or rotary cutters are supported on the machine by their shafts so that they are freely rotatable. In order to hold the spiral blades of such cutters against the grinding surface of wheel 82 whereby the proper beveled edge will be ground throughout the length of said blades, the blade holder best shown in Fig. 10 is employed by preference. It consists of a slotted adjustable block 84 carrying a rod 85 near its outer end and supported upon the under side of arm 76. The upper end of rod 85 has guide member 86 shaped like an arrow head, and the spiral blades are turned by contact with either of the slanting sides of guide member 86 so that the desired cutting edge is ground throughout the length of the spiral blades. The rod 85 mounts a second adjustable block 87, held by a set screw or the like, and a bar 88 is rigidly attached to block 87 and extends upwardly. Pivoted on bar 88 is a blade holder 89 pressed downwardly against the apex of block 86 by means of spring 90. The spiral blades of the mower are interposed between holder 89 and member 86 before the grinding is started, and the blocks 84 and 87 are independently adjusted to insure contact of the blades and emery wheel.

The holder for the straight cutter bar during the grinding operation now remains to be described. See Figs. 10, 11 and 12. This holder is preferably in the form of a separate attachment, comprising a rod 91 having reduced ends 92 adapted to enter sockets or holes 93 (Fig. 3) in the posts 62 so that the rod may be rocked about its axis, as will be understood from Fig. 10. To effect this rocking a worm gear 94 is made fast upon rod 91 and a worm 95 turned by a knurled wheel 96 is meshed with gear 94 when the rod 91 is in position between posts 62. The worm 95 is carried upon bar 55. Turning the wheel 96 forces the ledger blade 103 against the beveled grinding wheel 81.

Figure 12:
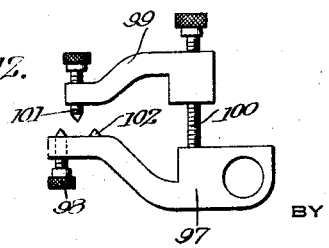
Fig. 12 is an elevation of one of the cutter bar clamps.

There are two or more blade clamps mounted on rod 91, one of which is shown separately in Fig. 12. It includes an arm 97 rigidly secured to rod 91 and having a clamping screw 98 at its outer end. An arm 99 is held in adjusted relationship to arm 97 by means of a threaded rod 100 secured to the latter arm. Obviously when rod 100 is turned arm 99 will be moved toward or from arm 97. A clamping screw 101 is at the outer end of arm 99 which is somewhat shorter than arm 97. The point of screw 101 is between the point of screw 98 and a projection 102 on arm 97, whereby the blade 103 (Fig. 10) may be clamped firmly between the two arms.

Figure 11:
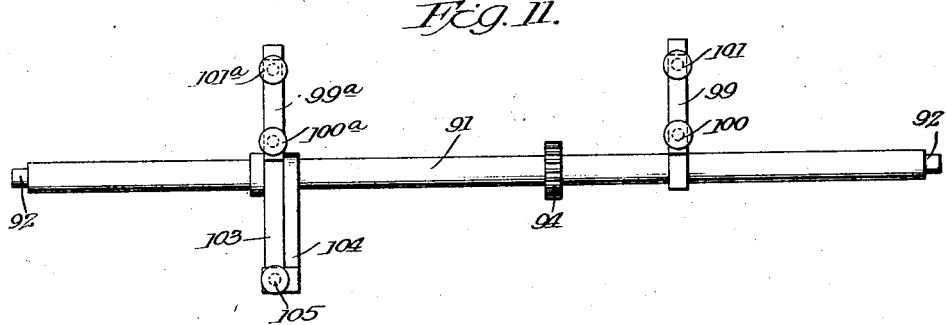
Fig. 11 is a plan view of the attachment employed for holding the cutter bar.

The other blade clamp is constructed similarly to the one shown in Fig. 12 and like parts are similarly designated except for the distinguishing reference character $a$. In addition, however, there is provided yieldable means for holding the cutter bar against emery wheel 81 acting independently of worm 95, which is used only for making an approximate adjustment of the cutter bar's position. As seen in Figs. 10 and 11, arm 97$^a$ is pivoted on rod 91 and has a straight extension 103$^a$; and alongside said extension a T-shaped arm 104 is mounted, being fixedly secured at its inner end to rod 91. The head of T-shaped arm 104 has flanges 104$^a$ at opposite ends, and an adjusting screw 105 passes through the upper flange 104$^a$ to engage with extension 103$^a$, while a spring 106 mounted on extension 103$^a$ bears against the lower flange 104$^a$. The tendency of spring 106 is obviously to move extension 103$^a$ upwardly or in a counterclockwise direction, and the arm 97$^a$ downwardly, while screw 105 when turned downwardly will increase the tension of spring 106, and will cause the blade 103 to be held more forcibly against the emery wheel 81. In other words, the spring 106 opposes the screw 105 in leveling the ledger blade.

The foregoing is a description of a preferred embodiment of the invention but it will be clear that the invention is not limited to the showing of the drawing and that many changes involving omission, substitution, alteration or reversal of parts may be made without departing from my invention, which is best defined in the following claims.

What is claimed is:—

1. In a lawn mower sharpening machine, a frame, a grinding wheel on the frame, a reciprocating carriage guided for movement parallel to the axis of the wheel, a cutter bar support pivotally mounted for angular adjustment with respect to the movement of said carriage, a cutter bar carrier mounted for turning movement in said support, said support and carrier being laterally movable toward and away from said grinding wheel, means for turning said carrier in said support including a worm gear on the support and a worm on the carriage, and means for holding the cutter bar against the grinding wheel and comprising a resilient element permitting adjustment of the cutter bar with reference to the grinding wheel.

2. In combination with a grinding wheel, a rod, a ledger blade clamp mounted on said rod and having means for clamping a ledger blade in proper relation to the grinding wheel, said blade clamp being pivoted on said rod and having an extension, a set screw at one side of the extension fixed with respect to said rod and providing a stationary stop, and a spring on the opposite side of said extension operatively arranged between it and a stationary abutment also fixed to said rod to hold said extension yieldingly against said screw, said screw and spring adapted to maintain the blade in contact with the grinding means.

In testimony, that I claim the foregoing as my own, I have hereto affixed my signature.

HENRY YERKEY.